United States Patent
Durbin (10) Patent No.: US 11,198,497 B2
(45) Date of Patent: Dec. 14, 2021

(54) SPLICE FITTINGS THAT ARE AFFIXED TO STRINGERS VIA WEB-INSTALLED FASTENERS

(71) Applicant: The Boeing Company, Chicago, IL (US)

(72) Inventor: Devin D Durbin, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 169 days.

(21) Appl. No.: 16/446,549

(22) Filed: Jun. 19, 2019

(65) Prior Publication Data

US 2020/0398967 A1    Dec. 24, 2020

(51) Int. Cl.
  *B64C 1/06*   (2006.01)
  *B64C 1/12*   (2006.01)
  *B23P 15/00*  (2006.01)

(52) U.S. Cl.
  CPC .............. *B64C 1/069* (2013.01); *B23P 15/00* (2013.01); *B64C 1/061* (2013.01); *B64C 1/064* (2013.01); *B64C 1/12* (2013.01)

(58) Field of Classification Search
  CPC ....................................... B64C 1/069
  See application file for complete search history.

(56) References Cited

U.S. PATENT DOCUMENTS

| | | | | |
|---|---|---|---|---|
| 5,518,208 A | * | 5/1996 | Roseburg | B64C 1/064 244/132 |
| 6,003,812 A | * | 12/1999 | Micale | B25J 9/1687 244/117 R |
| 6,105,902 A | | 8/2000 | Pettit | |
| 6,328,261 B1 | * | 12/2001 | Wollaston | B23K 20/122 228/112.1 |
| 7,325,771 B2 | * | 2/2008 | Stulc | B64C 1/1492 244/119 |
| 7,823,362 B2 | * | 11/2010 | Meyer | B64C 1/069 52/713 |
| 7,938,367 B2 | | 5/2011 | Jarsaillon et al. | |
| 8,302,909 B2 | * | 11/2012 | Cazeneuve | B64C 1/069 244/120 |
| 8,353,479 B2 | * | 1/2013 | Tacke | B64C 1/061 244/119 |

(Continued)

FOREIGN PATENT DOCUMENTS

| | | |
|---|---|---|
| AT | 400390 B | 12/1995 |
| EP | 2238021 A2 | 10/2010 |

(Continued)

OTHER PUBLICATIONS

Raytheon Aircraft Hawker Horizon Reaches Fuselage Milestone (Year: 2009).*
European Search Report; Application EP20180493; Nov. 12, 2020.

*Primary Examiner* — Jason L Vaughan
(74) *Attorney, Agent, or Firm* — Duft & Bornsen, PC (57) ABSTRACT

Systems and methods are provided for installing splice fittings. One embodiment is a method for forming a splice between stringers. The method includes aligning a web of a splice fitting with a web of a first stringer and a web of a second stringer, and coupling the first stringer and the second stringer by installing fasteners that secure the web of the first stringer to the web of the splice fitting, and by installing fasteners that secure the web of the second stringer to the web of the splice fitting.

20 Claims, 9 Drawing Sheets

(56) References Cited

U.S. PATENT DOCUMENTS

| | | | |
|---|---|---|---|
| 8,453,975 B2* | 6/2013 | Dietrich | B64C 1/069 244/132 |
| 8,500,068 B2 | 8/2013 | Villares et al. | |
| 8,528,865 B2* | 9/2013 | Tacke | B64C 1/064 244/131 |
| 8,960,606 B2* | 2/2015 | Diep | B64C 1/069 244/132 |
| 9,216,811 B2* | 12/2015 | De Ruffray | B64C 1/069 |
| 9,586,667 B2 | 3/2017 | Reeves | |
| 10,150,553 B2* | 12/2018 | Cacciaguerra | B64C 1/069 |
| 10,800,507 B2* | 10/2020 | Storozuk | B64C 1/38 |
| 2008/0067289 A1 | 3/2008 | Meyer | |
| 2010/0320321 A1 | 12/2010 | Sauermann | |
| 2015/0059142 A1* | 3/2015 | Jong | B29C 73/04 29/402.14 |
| 2016/0152317 A1* | 6/2016 | Reeves | B64C 1/069 244/131 |

FOREIGN PATENT DOCUMENTS

| | | |
|---|---|---|
| EP | 2848394 A1 | 3/2015 |
| EP | 3028940 A1 | 6/2016 |
| EP | 2727821 B1 | 3/2017 |
| WO | 9858759 A1 | 12/1998 |
| WO | 2009095133 A2 | 8/2009 |
| WO | 2009095133 A3 | 10/2009 |

* cited by examiner

SPLICE FITTINGS THAT ARE AFFIXED TO STRINGERS VIA WEB-INSTALLED FASTENERS

FIELD

The disclosure relates to the field of assembly, and in particular, to assembly of structural components via splices that use fasteners.

BACKGROUND

Complex structures, such as the fuselage of an aircraft, may be assembled by splicing structural components together. For example, fasteners may be used to attach stringers, frame elements, and a skin of an aircraft together in order to create an airframe or other monocoque structure. One location which utilizes fasteners is known as a body join station, wherein multiple lengthwise portions of fuselage (e.g., barrel sections), are fastened together. As a part of the joining process, stringers from different lengthwise portions of the fuselage are spliced together in circumferential or semi-circumferential splices, using splice fittings.

Splice fittings are desirable because they unite stringers into an integral piece, enabling load to be transferred across the splices. However, splice fittings require a large number of fasteners, which results in increased weight. Furthermore, splice fittings share the same fasteners that are used to secure stringers to underlying skin. Because splice fittings use the same fasteners as the ends of stringers, and because current splices need flexibility at the ends of stringers to facilitate alignment through corresponding splice fittings, the ends of stringers must remain unsecured before a splice fitting is installed.

Therefore, it would be desirable to have a method and apparatus that take into account at least some of the issues discussed above, as well as other possible issues.

SUMMARY

Embodiments described herein provide a splice fitting for stringers. The splice fitting is secured to the stringers via fasteners that penetrate through a web of the splice fitting. The splice fitting is separately secured to a skin splice strap via fasteners that penetrate its skin flange. Because of this unique geometric arrangement, fasteners used to attach a splice fitting to a stringer are not used to attach the stringer to the underlying skin. Hence, stringers may be fully installed into their respective fuselage sections before they are spliced, which results in both labor and weight savings.

One embodiment is a method for forming a splice between stringers. The method includes aligning a web of a splice fitting with a web of a first stringer and a web of a second stringer, and coupling the first stringer and the second stringer by installing fasteners that secure the web of the first stringer to the web of the splice fitting, and by installing fasteners that secure the web of the second stringer to the web of the splice fitting.

A further embodiment is a non-transitory computer readable medium embodying programmed instructions which, when executed by a processor, are operable for performing a method for forming a splice between stringers. The method includes aligning a web of a splice fitting with a web of a first stringer and a web of a second stringer, and coupling the first stringer and the second stringer by installing fasteners that secure the web of the first stringer to the web of the splice fitting, and by installing fasteners that secure the web of the second stringer to the web of the splice fitting.

Another embodiment is an apparatus in the form of a splice between stringers. The apparatus comprises a splice fitting that is aligned with a first stringer and a second stringer, is coupled to the first stringer and the second stringer via fasteners that are driven through a web of the first stringer and a web of the splice fitting, and via fasteners that attach a web of the second stringer to the web of the splice fitting.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The stringers and splice fittings discussed herein may be implemented for metal or composite parts as desired. Composite parts, such as Carbon Fiber Reinforced Polymer (CFRP) parts, are initially laid-up in multiple layers that together are referred to as a preform. Individual fibers within each layer of the preform are aligned parallel with each other, but different layers may exhibit different fiber orientations in order to increase the strength of the resulting composite along different dimensions. The preform may include a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated. The inventive systems and techniques described herein may be implemented with composite parts, metal parts, or other components of sufficient structural strength.

Figure 1:
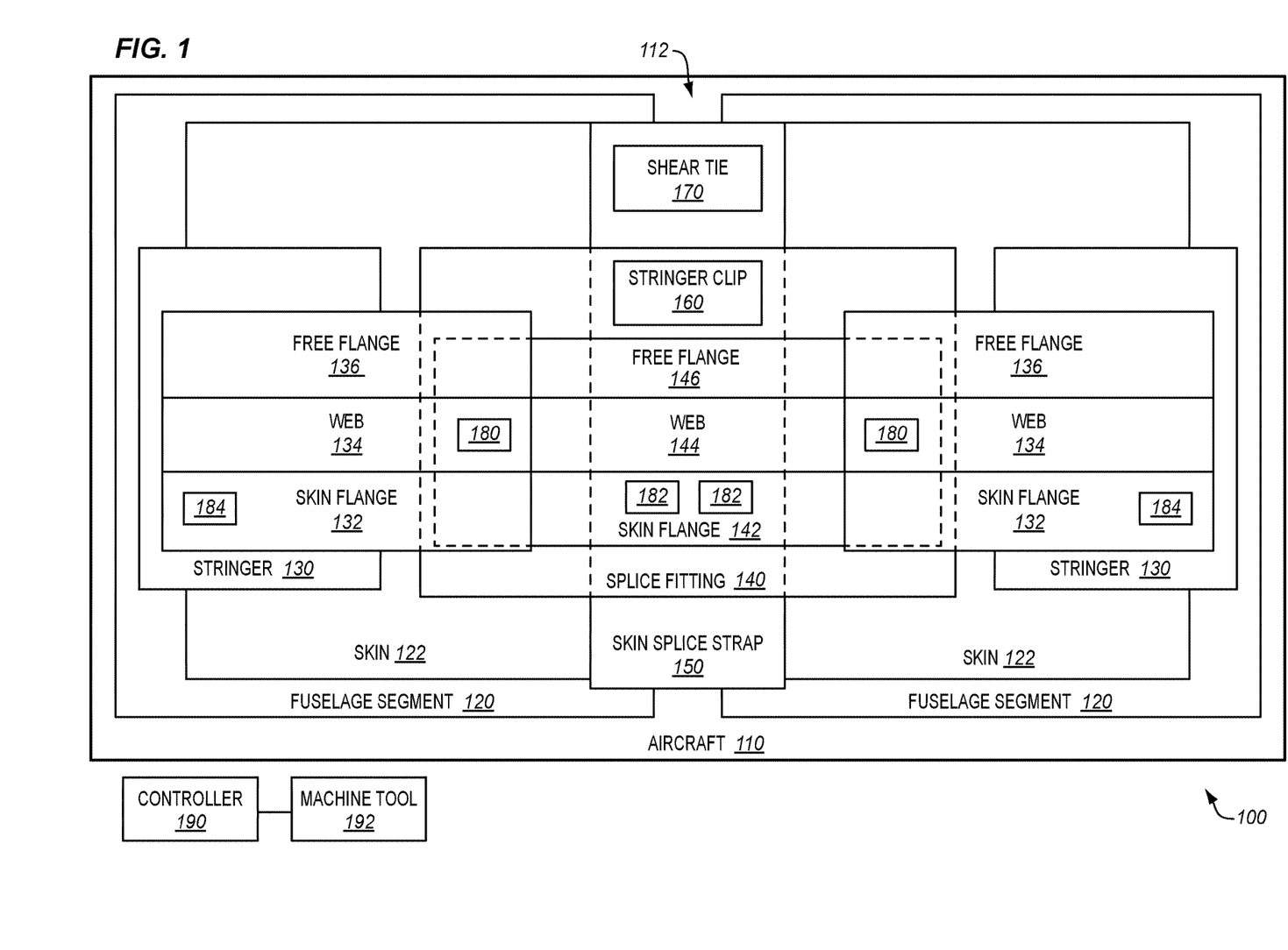
FIG. 1 is a block diagram of a splice between stringers in an illustrative embodiment.

FIG. 1 is a block diagram of a splice 112 between stringers in an illustrative embodiment. Splice 112 comprises any arrangement of components operable to transfer loads (e.g., axial loads) between stringers. In this embodiment, splice 112 includes a splice fitting 140 that has been enhanced to utilize fasteners 180 along its web 144 to secure itself to stringers 130, while using fasteners 182 along its skin flange 142 to secure itself to skin splice strap 150. This provides a technical benefit by enabling the stringers 130 to be fully secured to skin 122 prior to the formation of splice 112, because the stringers 130 do not share fasteners with splice fitting 140 that also penetrate skin 122. When stringers 130 are fully secured to skin 122, the amount of labor and workup needed to create the splice 112 is beneficially reduced. Throughout FIG. 1, dashed lines indicate that splice fitting 140 is placed atop skin splice strap 150, that portions of the stringers 130 cover the splice fitting 140. In further embodiments, the web 144 of the splice fitting 140 has a tapering thickness that decreases towards the first stringer and that decreases towards the second stringer to convey stresses along the splice.

As shown in FIG. 1, splice 112 is located within assembly environment 100, which includes fuselage segments 120. Fuselage segments 120 may comprise, for, example, lengthwise segments of fuselage that are barrel-shaped (or half-barrel shaped), or that are formed from longitudinally or circumferentially spliced skin panels. Stringers 130 are affixed to the fuselage segments 120, and each include a skin flange 132, a web 134, and a free flange 136. For example, stringers 130 may be fully affixed to fuselage segments 120 via fasteners 184. That is, prior to splicing, Stringers 130 are fastened along their entire length to their fuselage segments 120. Fasteners 184 secure the skin flanges 132 of the stringers to the skin 122 of a fuselage segment 120. Stringers 130 may be secured to their corresponding fuselage segments prior to the assembly of splice 112. Unlike prior fabrication systems wherein the ends of stringers would be left unattached from a supplier/fabricator in order to give the splicing entity more freedom of action/movement to facilitate the splice by longitudinally aligning stringer ends, the present system is capable of foregoing such processes in order to enhance fabrication speed. This eliminates the need to push stringer ends relative to their centerline in order to enforce alignment with a splice fitting by longitudinally aligning stringer ends. This further eliminates the need for complex personnel training and engineering support to facilitate splice assembly. That is, previously, the unique nature of each splice required special technical training to carry out splicing and engineering support in order for work to be dispositioned.

Assembly environment further includes a controller 190, which in one embodiment operates one or more machine tools 192 for installing fasteners and/or aligning components of splice 112. Controller 190 may be implemented, for example, as custom circuitry, as a hardware processor executing programmed instructions, or some combination thereof. Machine tool 192 may comprise a riveting machine, bolt installation machine, robotic end effector, etc. The operations of machine tool 192 result in the assembly of splice 112 at aircraft 110. In further embodiments, technicians perform fastener installation via the machine tool 192.

Splice 112 mechanically unites the ends of stringers 130 in different fuselage segments. Splice 112 includes splice fitting 140, which mechanically unites the stringers 130. Splice fitting 140 includes a skin flange 142, web 144, and free flange 146-. Skin flange 142 is secured to skin splice strap 150 via fasteners 182, and web 144 is secured to webs 134 of stringers 130 via fasteners 180. This enables splice fitting 140 to transfer loads between stringers 130. A stringer clip 160 is attached to splice fitting 140, and a shear tie 170 is attached to skin splice strap 150. Stringer clip 160 and shear tie 170 connect to a circumferential frame in order to enhance rigidity. In addition to securing the splice fitting 140 in place, skin splice strap 150 performs an additional role in securing the skins 122 together. The various fasteners used herein may comprise rivets, bolts with swaged-on collars, bolts with screwed on nuts or other fastening devices suitable for the aerospace industry.

Illustrative details of the operations of controller 190 and machine tool 192 will be discussed with regard to FIG. 2. Assume, for this embodiment, that stringers 130 have not yet been secured to fuselage segments 120.

Figure 2:
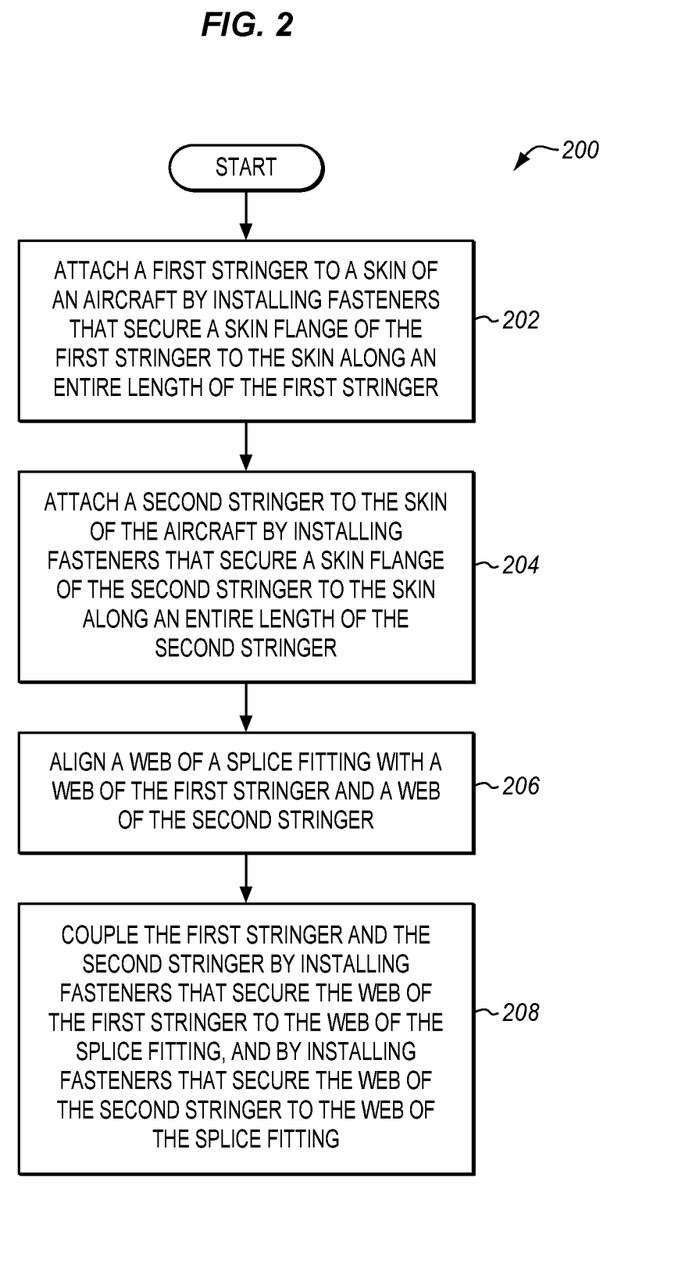
FIG. 2 is a flowchart illustrating a method for assembling a splice between stringers in an illustrative embodiment.

FIG. 2 is a flowchart illustrating a method 200 for assembling a splice in an illustrative embodiment. The steps of method 200 are described with reference to assembly environment 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, controller 190 operates one or more of machine tools 192 to attach a first of stringers 130 to a skin 122 of an aircraft 110 along an entire length of the first of stringers 130. This may be performed by installing fasteners 184, which secure the skin flange 132 of the stringer 130 to the skin 122 of its fuselage segment 120. In one embodiment, installing fasteners 184 comprises installing rivets. The entire length of the stringer 130 is affixed to the skin 122, even though the stringer 130 has not yet been affixed to the splice fitting 140. This is made possible because the stringer 130 will be affixed to the splice fitting 140 via its web 134, instead of via the skin flange 132.

In step 204, controller 190 operates one or more of machine tools 192 to attach a second of stringers 130 to a skin 122 of an aircraft 110 along an entire length of the second of stringers 130. This may be performed by installing fasteners 184, which secure the skin flange 132 of the stringer 130 to the skin 122 of its fuselage segment. The second stringer is disposed in a different fuselage segment than the first stringer, and ends of these two stringers will be made mechanically integral/fixedly attached to each other when the splice is performed. Just like in step 202, the entire length of the stringer 130 is affixed to the skin 122, even though the stringer 130 has not yet been affixed to the splice fitting 140. This is made possible because the stringer 130 will be affixed to the splice fitting 140 via its web 134, instead of via the skin flange 132.

Steps 202-204 may be repeated multiple times synchronously or asynchronously to install all stringers 130 at each of the fuselage segments 120. The fuselage segments 120 and integrated stringers may then be transported to a new manufacturing cell for additional assembly. Furthermore, a skin splice strap 150 may be installed to mechanically unite the skins of different fuselage segments.

In step 206, the web 144 of the splice fitting 140 is aligned with the web of the first stringer and the web of the second stringer. Because the stringers are already completely attached to the skin 122 along their length, there is no need to manually move the stringers in order to achieve a desired alignment. Instead, alignment may be achieved by moving the splice fitting 140 into position over/along the stringers, such that the web 144 and skin flange 142 of the splice fitting 140 cover the web 134 and skin flange 132 of the stringers 130. Less constrictions on alignment enables a greater freedom of movement of the splice fitting 140 relative to the stringers 130 being spliced. Surfaces with potential shims are therefore reduced to an interface between the webs. This technique eliminates the need to perform prior techniques of side-to-side alignment of ends of the stringers to the splice fitting 140.

The step of aligning comprises covering or enveloping the flanges and webs of the stringers 130 that are being united. For example, aligning the splice fitting 140 may comprise covering a portion of the skin flange 132 and the web 134, (and even the free flange 136) of the first stringer and the second stringer with the splice fitting 140. In one embodiment, aligning the splice fitting 140 comprises disposing the skin flange 142 of the splice fitting 140 atop the skin flange 132 of the first stringer, disposing the web 144 of the splice fitting beside the web 134 of the first stringer. The aligning may further comprise disposing the free flange 146 of the splice fitting atop the free flange 136 of the first stringer.

In step 208, the first stringer and the second stringer are coupled (i.e., fixedly attached to each other) by installing fasteners 180 that secure the web 134 of the first stringer to the web 144 of the splice fitting 140, and by installing fasteners 180 that secure the web 134 of the second stringer to the web 144 of the splice fitting 140. Installing fasteners 180 may comprise driving bolts through the web 144 of the splice fitting 140 (as well as the webs 134 of the stringers 130) and securing the bolts with collars. In some embodiments, this further comprises aligning the splice fitting 140 with the skin splice strap 150 and drilling out fastener holes through the skin flange 142 and the skin splice strap 150. This may further comprise sealing any fastening surfaces and installing fasteners. Thus, splice fitting 140 may be coupled/secured in place relative to skin splice strap 150 by installing fasteners 182 that secure the skin flange 142 of the splice fitting 140 to the skin splice strap 150. After splice 112 has been assembled, loads/forces (e.g., axial loads) are transferred from the first stringer to the second stringer via the splice fitting 140. Method 200 may be repeated at each of multiple radial locations along a fuselage of an aircraft in order to form multiple splices 112 as desired.

Method 200 provides a technical benefit over prior techniques in that it enables a splice to be assembled even after stringers have been fully secured to fuselage segments. This enhances the assembly speed for fuselage segments, and reduces the need to physically manipulate partially installed stringers when assembling a splice. This in turn results in saved labor, reducing costs.

With a discussion provided above of assembly of a splice, the following section will illustrate locations in which splices may be installed, as well as illustrating specific configurations of splice fittings that provide the benefits discussed above.

Figure 3:
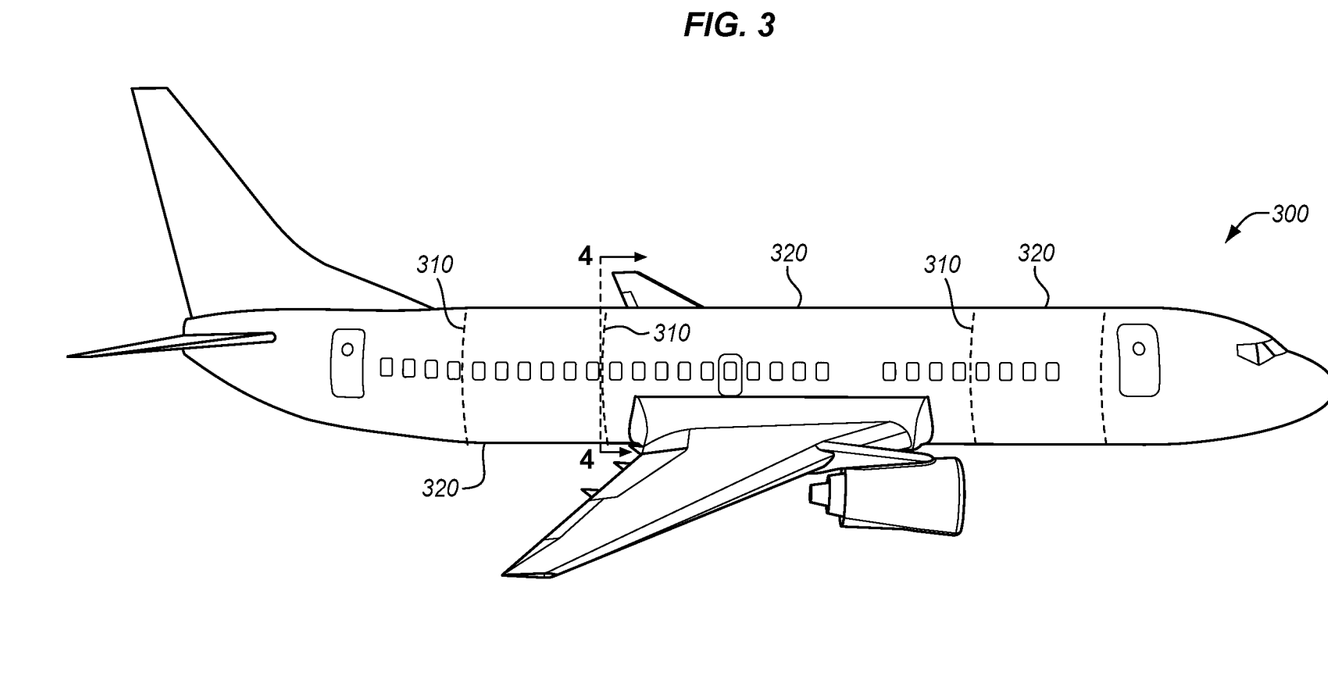
FIG. 3 is a side view of an aircraft having locations at which body joins may be performed in an illustrative embodiment.

FIG. 3 is a side view of an aircraft 300 having locations 310 at which body joins such as circumferential splices may be performed in an illustrative embodiment. Locations 310 are ring-shaped segments at which fuselage segments 320 may be structurally united.

Figure 4:
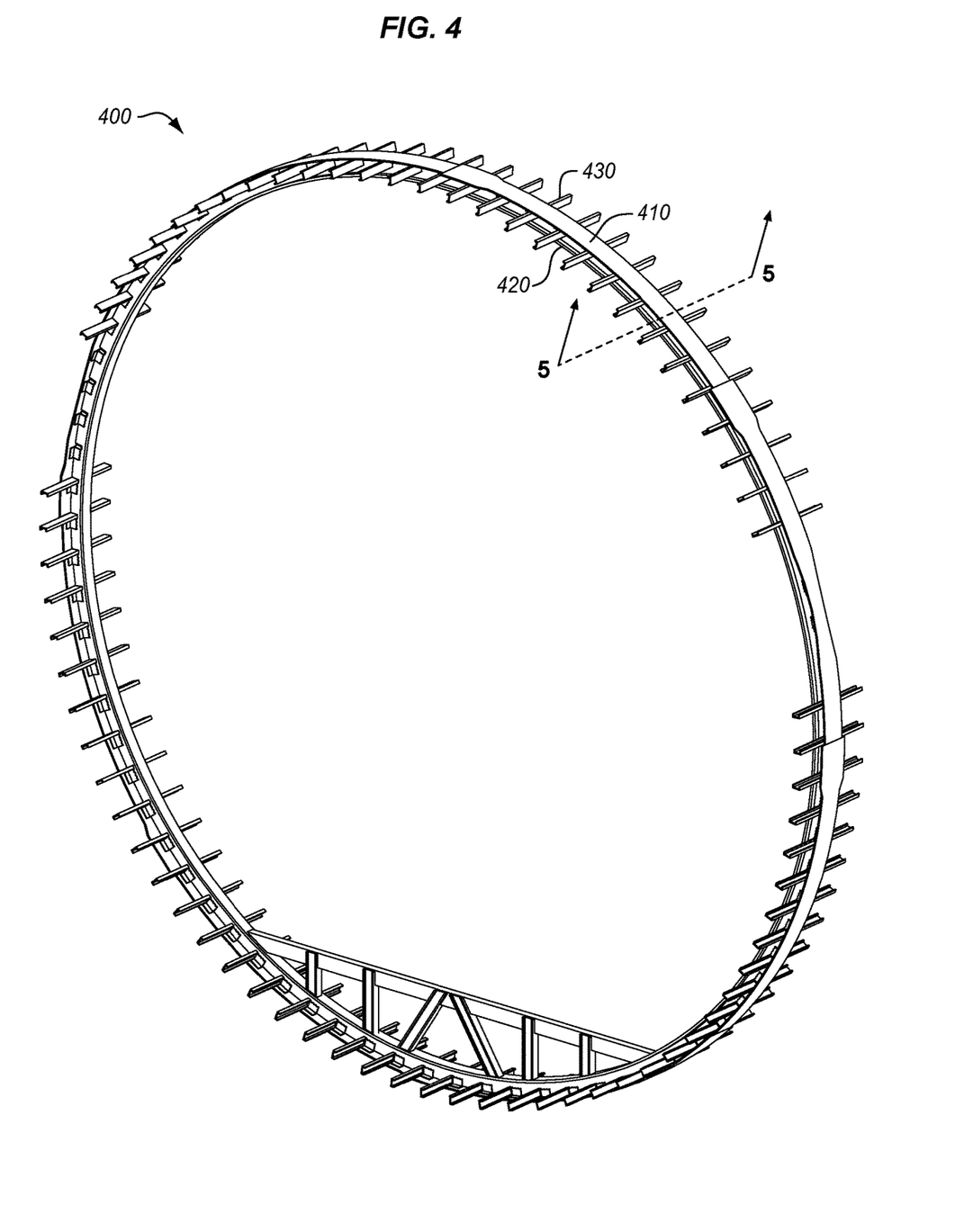
FIG. 4 is a rear perspective view of a body join station in an illustrative embodiment.

FIG. 4 is a rear perspective view of a body join station 400 in an illustrative embodiment, and corresponds with view arrows 4 of FIG. 3. As shown in FIG. 4, body join station 400 includes a support ring 420, and a skin splice strap 410. Multiple splice fittings 430 are disposed at different radial locations along the body join station 400.

Figure 5:
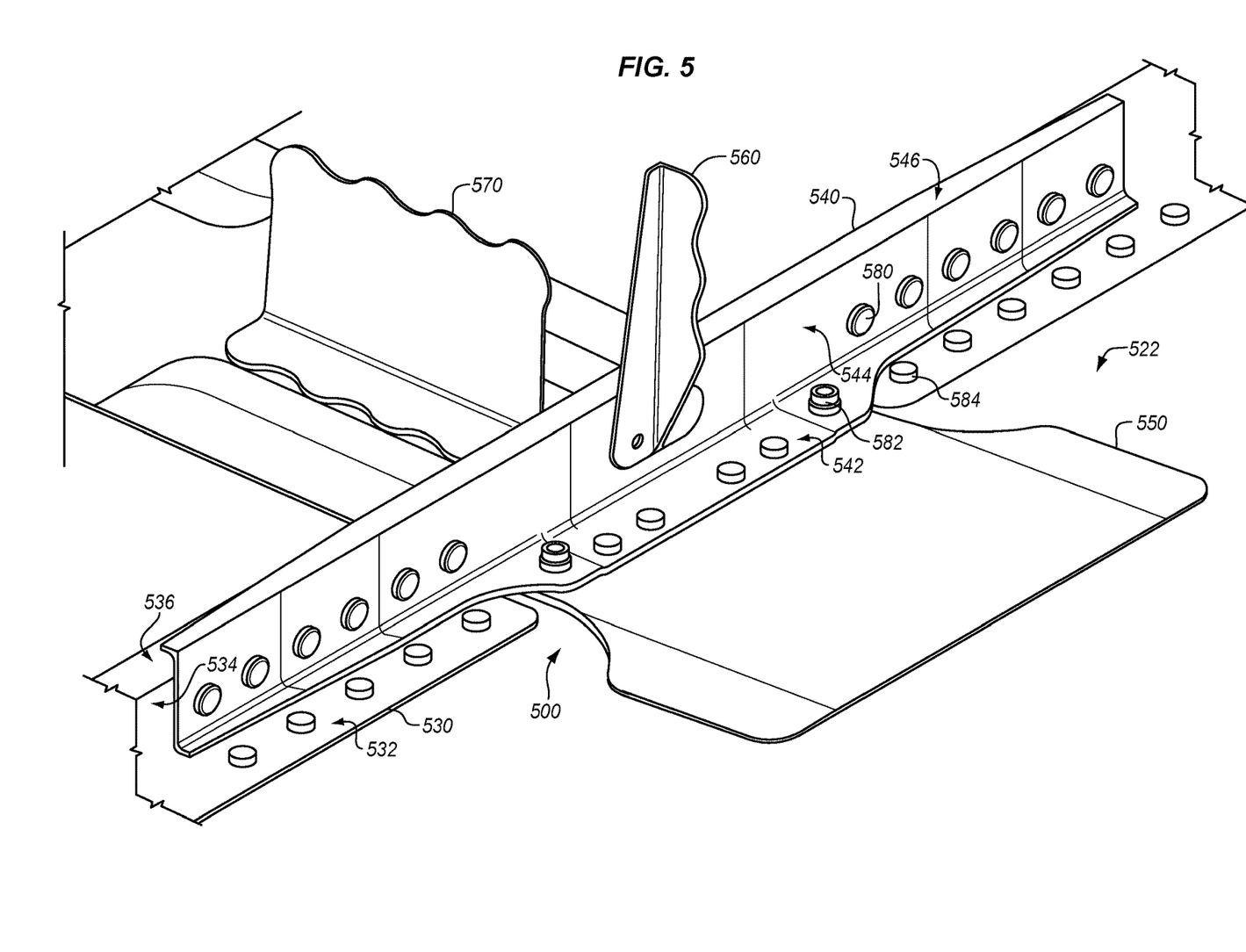
FIG. 5 is a perspective view of a splice utilizing a first splice fitting in an illustrative embodiment.

FIG. 5 is a perspective view of a splice 500 utilizing a first splice fitting 540 in an illustrative embodiment, and corresponds with view arrows 5 of FIG. 4. First splice fitting 540 exhibits a Z-shaped cross-section, and includes skin flange 542, web 544, and free flange 546. Skin flange 542 is secured via fasteners 582 to skin splice strap 550, which is attached to skin 522. Stringers 530 include free flange 536, web 534, and skin flange 532. Stringers 530 are attached to skin 522 via fasteners 584 that pass through their skin flanges 532, and are secured to first splice fitting 540 via fasteners 580 (e.g., bolts with collars, bolts with nuts, rivets, etc.) that pass through their web. Stringer clip 560 is affixed to web 544 of the first splice fitting 540, and shear tie 570 is affixed to skin splice strap 550. Stringer clip 560 and shear tie 570 attach to frames running hoopwise (not shown).

Furthermore regarding FIG. 5, some of the fasteners 584 at the stringer skin flange are covered by first splice fitting 540, because first splice fitting 540 is installed after the stringers 530 are attached to the skin 522. In further embodiments, a joggle is integrated into the splice, in order to accommodate aligning the web on opposite ends of the splice fitting to the stringer web, while still providing fasteners through a skin flange.

Figure 6:
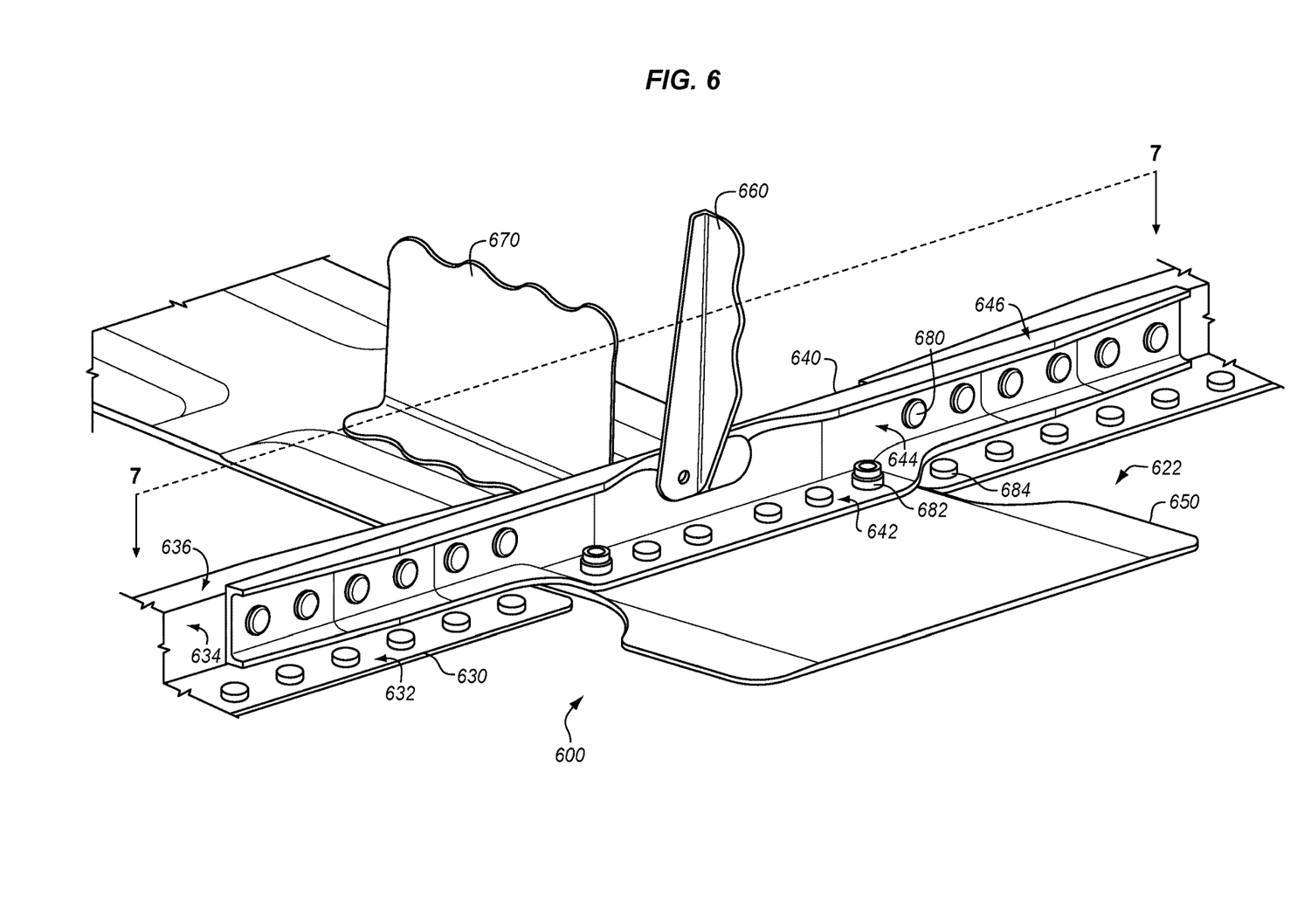
FIG. 6 is a perspective view of a splice utilizing a second splice fitting in an illustrative embodiment.

FIG. 6 is a perspective view of a splice 600 utilizing a second splice fitting 640 in an illustrative embodiment, and corresponds with view arrows 5 of FIG. 4. In FIG. 6, second splice fitting 640 exhibits a C-channel shaped cross-section, and includes skin flange 642, web 644, and free flange 646. The upper flange of the C-shaped cross-section provides greater sideways bending resistance and helps to increase the cross-sectional size of the splice to help resist tension loading. Furthermore, the advantage of the C-channel is that it enables easier access to shim the web if desired. Skin flange 642 is secured via fasteners 682 to skin splice strap 650, which is attached to skin 622. Stringers 630 include free flange 636, web 634, and skin flange 632. Stringers 630 are attached to skin 622 via fasteners 684 that pass through their skin flanges 632, and are secured to second splice fitting 640 via fasteners 680 that pass through their web. Stringer clip 660 is affixed to web 644 of the second splice fitting 640, and shear tie 670 is affixed to skin splice strap 650. In further embodiments, splice fittings may utilize any suitable cross-sections, such as hat-shapes, Y shapes, etc.

Figure 7:
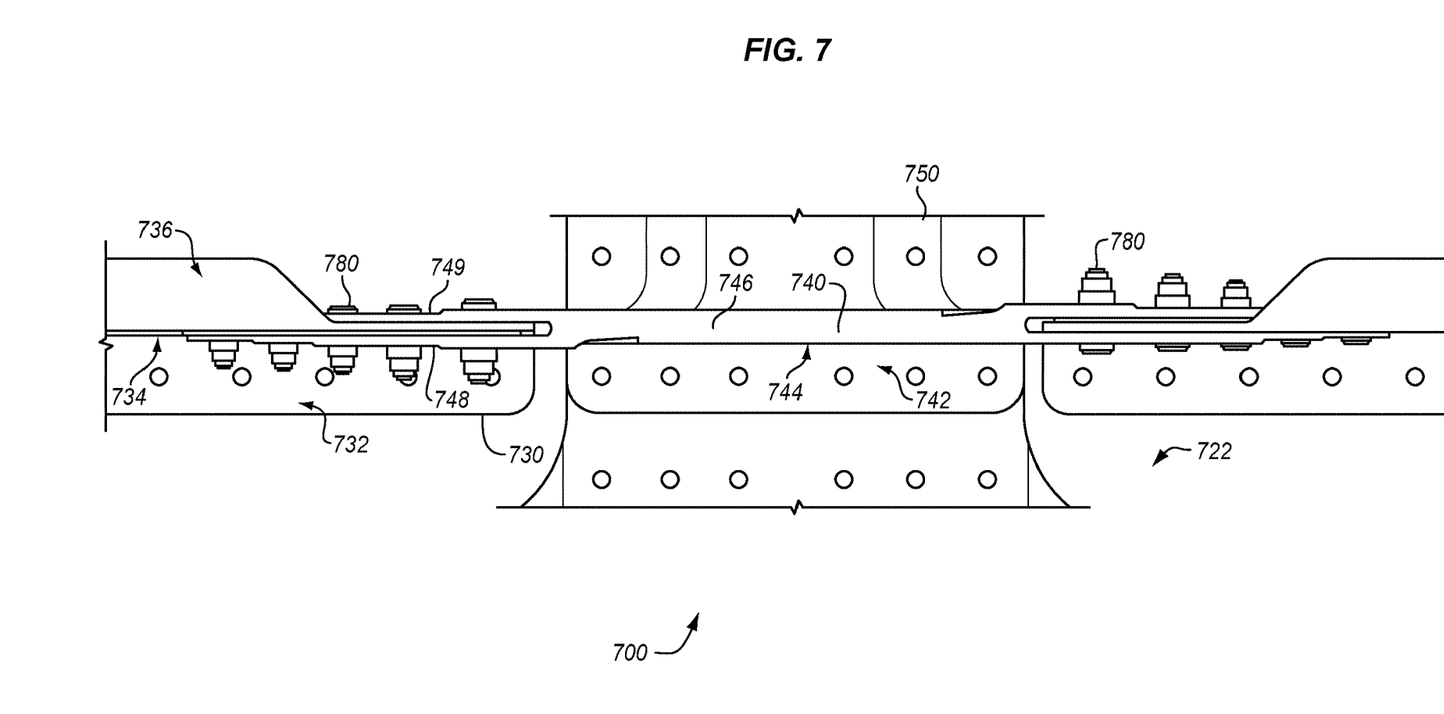
FIG. 7 is a top view of a splice utilizing a third splice fitting in an illustrative embodiment.

FIG. 7 is a top view of a splice 700 utilizing a third splice fitting 740 in an illustrative embodiment, and corresponds with view arrows 7 of FIG. 6. In FIG. 7, third splice fitting 740 includes skin flange 742 and web 746. In one embodiment, a free flange on the splice extends in length for the same distance as the skin flange. In a further embodiment, the web 746 is wider than previous embodiments, in order to support loads associated with the double-shear web attachments on its left and right ends. The arrangement of the splice depicted in FIG. 7, enables the splice fitting to sandwich the ends of webs 734 of the stringers 730. In this embodiment, the free flanges 736 of the stringers have been cut back to facilitate sliding the stringer 730 onto the splice fitting 140 until the skin flange 732 is seated for fastener installation. In this instance, the stringer flanges are not cut back just prior to splice installation. Rather, the ends of the stringers have a different shape when installed that includes reduced flange length. Third splice fitting 740 also includes web 744, which is divided into front portion 748 and back portion 749. This places the fasteners 780 into double-shear, which beneficially enhances mechanical strength by increasing the ability of fasteners 780 to bear shearing forces. Skin flange 742 is secured (e.g., via fasteners) to skin splice strap 750, which is attached to skin 722. Stringers 730 are attached to skin 722 (e.g., via fasteners that pass through their skin flanges 732), and are secured to third splice fitting 740 via fasteners 780 that pass through their web. Stringers 730 also include webs 734 and free flanges 736. FIG. 7 further illustrates that fastener diameter decreases towards the periphery of the splice, which helps to convey loading into and out of the splice.

Figure 8:
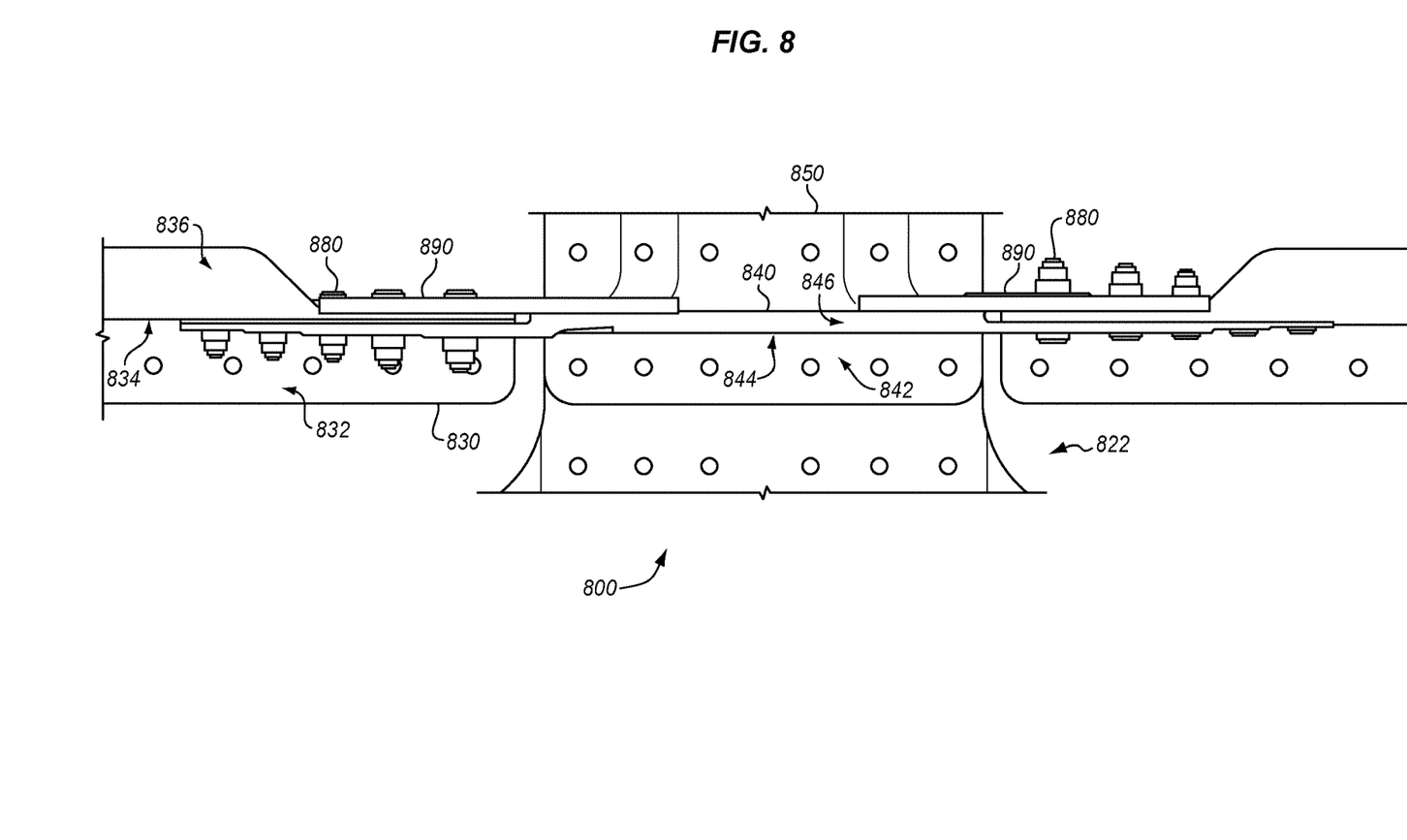
FIG. 8 is a top view of a splice utilizing a fourth splice fitting in an illustrative embodiment.

FIG. 8 is a top view of a splice 800 utilizing a fourth splice fitting 840 in an illustrative embodiment, and corresponds with view arrows 7 of FIG. 6. In FIG. 8, fourth splice fitting 840 includes skin flange 842, web 844, and free flange 846. Web 844 is affixed to backing plates 890. This places the fasteners 880 into double shear, which beneficially enhances mechanical strength by increasing the ability of fasteners 880 to bear shearing forces. Skin flange 842 is secured (e.g., via fasteners) to skin splice strap 850, which is attached to skin 822. Stringers 830 are attached to skin 822 (e.g., via fasteners that pass through their skin flanges 832), and are secured to fourth splice fitting 840 via fasteners 880 that pass through their web. Stringers 830 also include webs 834 and free flanges 836. In this embodiment, the backing plates 890 are two separate entities, however, in further embodiments the backing plates 890 form a single integral piece. In further embodiments, backing plates 890 span from stringer to stringer. In further embodiments, the stringers do not have their free flanges 846 trimmed back, because the backing plates 890 can be slid under a full-length free flange and fasteners installed in double shear out to desired locations. In this instance, the stringer flanges are not cut back just prior to splice installation. Rather, the ends of the stringers have a different shape when installed that includes reduced flange length.

EXAMPLES

In the following examples, additional processes, systems, and methods are described in the context of a splice for an aircraft.

Figure 9:
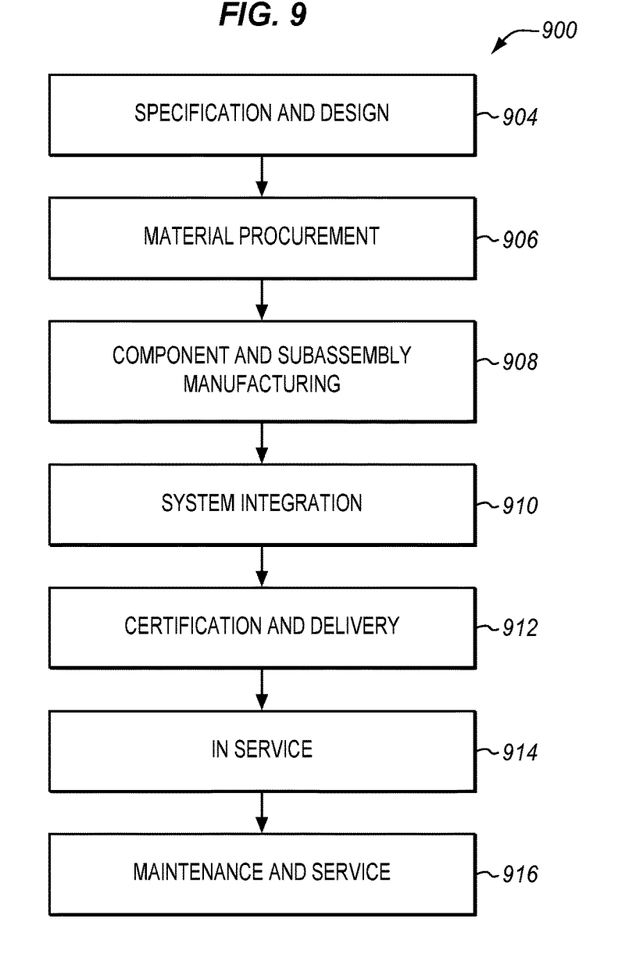
FIG. 9 is a flow diagram of aircraft production and service methodology in an illustrative embodiment.
Figure 10:
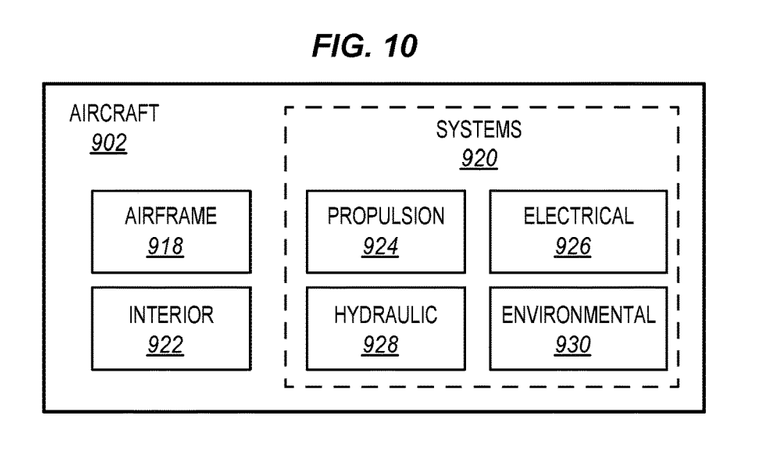
FIG. 10 is a block diagram of an aircraft in an illustrative embodiment.

Referring more particularly to the drawings, embodiments of the disclosure may be described in the context of aircraft manufacturing and service in method 900 as shown in FIG. 9 and an aircraft 902 as shown in FIG. 10. During pre-production, method 900 may include specification and design 904 of the aircraft 902 and material procurement 906. During production, component and subassembly manufacturing 908 and system integration 910 of the aircraft 902 takes place. Thereafter, the aircraft 902 may go through certification and delivery 912 in order to be placed in service 914. While in service by a customer, the aircraft 902 is scheduled for routine work in maintenance and service 916 (which may also include modification, reconfiguration, refurbishment, and so on). Apparatus and methods embodied herein may be employed during any one or more suitable stages of the production and service described in method 900 (e.g., specification and design 904, material procurement 906, component and subassembly manufacturing 908, system integration 910, certification and delivery 912, service 914, maintenance and service 916) and/or any suitable component of aircraft 902 (e.g., airframe 918, systems 920, interior 922, propulsion system 924, electrical system 926, hydraulic system 928, environmental 930).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 902 produced by method 900 may include an airframe 918 with a plurality of systems 920 and an interior 922. Examples of systems 920 include one or more of a propulsion system 924, an electrical system 926, a hydraulic system 928, and an environmental system 930. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 900. For example, components or subassemblies corresponding to component and subassembly manufacturing 908 may be fabricated or manufactured in a manner similar to components or subassemblies produced while the aircraft 902 is in service. Also, one or more apparatus embodiments, method embodiments, or a combination thereof may be utilized during the subassembly manufacturing 908 and system integration 910, for example, by substantially expediting assembly of or reducing the cost of an aircraft 902. Similarly, one or more of apparatus embodiments, method embodiments, or a combination thereof may be utilized while the aircraft 902 is in service, for example and without limitation during the maintenance and service 916. For example, the techniques and systems described herein may be used for material procurement 906, component and subassembly manufacturing 908, system integration 910, service 914, and/or maintenance and service 916, and/or may be used for airframe 918 and/or interior 922. These techniques and systems may even be utilized for systems 920, including, for example, propulsion system 924, electrical system 926, hydraulic 928, and/or environmental system 930.

In one embodiment, a part comprises a portion of airframe 918, and is manufactured during component and subassembly manufacturing 908. The part may then be assembled into an aircraft in system integration 910, and then be utilized in service 914 until wear renders the part unusable. Then, in maintenance and service 916, the part may be discarded and replaced with a newly manufactured part. Inventive components and methods may be utilized throughout component and subassembly manufacturing 908 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for forming a splice between stringers, the method comprising:
   prior to coupling the first stringer to the second stringer, attaching the first stringer to a skin of an aircraft and attaching the second stringer to the skin of the aircraft;
   aligning a web of a splice fitting with a web of a first stringer and a web of a second stringer while aligning a skin flange of the splice fitting with a skin splice strap;
   directly coupling the first stringer and the second stringer to the splice fitting exclusively by installing fasteners that secure the web of the first stringer to the web of the splice fitting and
installing fasteners that secure the web of the second stringer to the web of the splice fitting; and
   completing attachment of the first stringer to the second stringer for the splice while the first stringer and the second stringer remain coupled to the splice fitting exclusively by the fasteners that secure the web of the first stringer to the web of the splice fitting and the fasteners that secure the web of the second stringer to the web of the splice fitting.

2. The method of claim 1 wherein:
   coupling the splice fitting to the skin splice strap is performed exclusively by installing fasteners that secure the skin flange of the splice fitting to the skin splice strap and an underlying skin without contacting the first stringer or the second stringer; and
   completing the splice while the splice fitting and the skin splice strap are coupled to each other exclusively by the fasteners that secure the skin flange of the splice fitting to the skin splice strap and the underlying skin without contacting the first stringer or the second stringer.

3. The method of claim 1 wherein:
   attaching the first stringer to a skin of an aircraft is performed by installing fasteners that directly secure a skin flange of the first stringer to the skin along the first stringer; and
   attaching the second stringer to the skin of the aircraft is performed by installing fasteners that directly secure a skin flange of the second stringer to the skin along the second stringer.

4. The method of claim 3 wherein:
   installing fasteners that secure the skin flange of the first stringer to the skin comprises installing fasteners along an entire length of the first stringer; and
   installing fasteners that secure the skin flange of the second stringer to the skin comprises installing fasteners along an entire length of the second stringer.

5. The method of claim 1 wherein:
   aligning comprises:
      disposing the skin flange of the splice fitting atop a skin flange of the first stringer; and
      disposing the web of the splice fitting beside the web of the first stringer.

6. The method of claim 5 wherein:
   aligning the splice fitting further comprises:
      disposing a free flange of the splice fitting at a free flange of the first stringer.

7. The method of claim 1 further comprising:
   placing the fasteners into double-shear.

8. The method of claim 1 wherein:
   the stringers have Z-shaped cross-sections.

9. The method of claim 1 wherein:
   installing the fasteners comprises installing fasteners selected from the group consisting of bolts and rivets.

10. The method of claim 1 further comprising:
    attaching a frame to a stringer clip that is attached to the fitting.

11. A non-transitory computer readable medium embodying programmed instructions which, when executed by a processor, are operable for performing a method for forming a splice between stringers, the method comprising:
    prior to coupling the first stringer to the second stringer, attaching the first stringer to a skin of an aircraft and attaching the second stringer to the skin of the aircraft;
    aligning a web of a splice fitting with a web of a first stringer and a web of a second stringer while aligning a skin flange of the splice fitting with a skin splice strap;
    directly coupling the first stringer and the second stringer to the splice fitting exclusively by installing fasteners that secure the web of the first stringer to the web of the splice fitting and installing fasteners that secure the web of the second stringer to the web of the splice fitting; and
    completing attachment of the first stringer to the second stringer for the splice while the first stringer and the second stringer remain coupled to the splice fitting exclusively by the fasteners that secure the web of the first stringer to the web of the splice fitting and the fasteners that secure the web of the second stringer to the web of the splice fitting.

12. The medium of claim 11 wherein the method further comprises:
    coupling the splice fitting to the skin splice strap is performed exclusively by installing fasteners that secure a skin flange of the splice fitting to the skin splice strap and an underlying skin; and completing the splice while the splice fitting and the skin splice strap are coupled to each other exclusively by the fasteners that secure the skin flange of the splice fitting to the skin splice strap and the underlying skin without contacting the first stringer or the second stringer.

13. The medium of claim 11 wherein:

attaching the first stringer to a skin of an aircraft is performed by installing fasteners that directly secure a skin flange of the first stringer to the skin along the first stringer; and attaching the second stringer to the skin of the aircraft is performed by installing fasteners that directly secure a skin flange of the second stringer to the skin along the second stringer.

14. The medium of claim 12 wherein:

installing fasteners that secure the skin flange of the first stringer to the skin comprises installing fasteners along an entire length of the first stringer; and installing fasteners that secure the skin flange of the second stringer to the skin comprises installing fasteners along an entire length of the first stringer.

15. The medium of claim 11 wherein:

aligning comprises:

disposing the skin flange of the splice fitting atop a skin flange of the first stringer; and disposing the web of the splice fitting beside the web of the first stringer.

16. The medium of claim 15 wherein:

aligning the splice fitting further comprises:

disposing a free flange of the splice fitting atop a free flange of the first stringer.

17. The medium of claim 11 wherein the method further comprises:

placing the fasteners into double-shear.

18. The medium of claim 11 wherein:

the stringers have Z-shaped cross-sections.

19. The medium of claim 11 wherein:

installing the fasteners comprises installing fasteners selected from the group consisting of bolts and rivets.

20. The medium of claim 11 wherein the method further comprises:

attaching a frame to a stringer clip that is attached to the fitting.

* * * * *